March 3, 1970     J. B. GUIN     3,498,137
MOTION MEASURING INSTRUMENT
Filed July 22, 1965     3 Sheets-Sheet 1
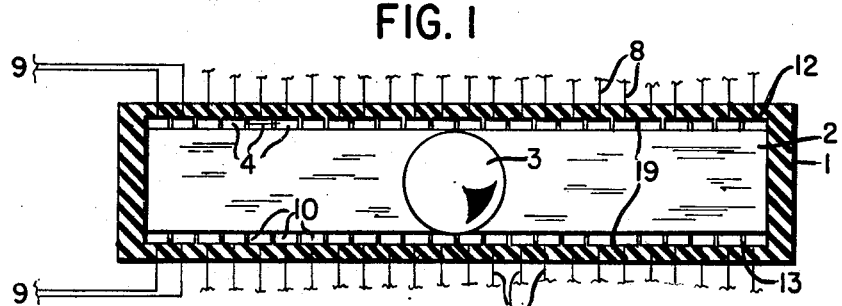
FIG. 1
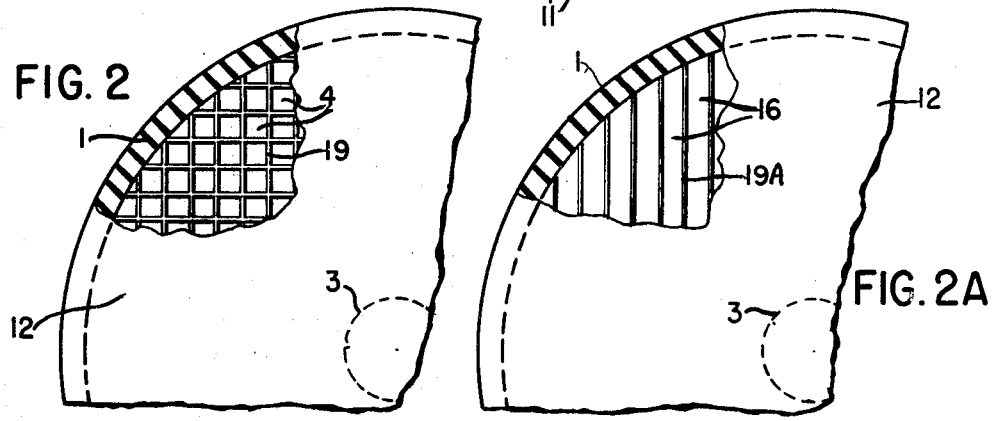
FIG. 2
FIG. 2A
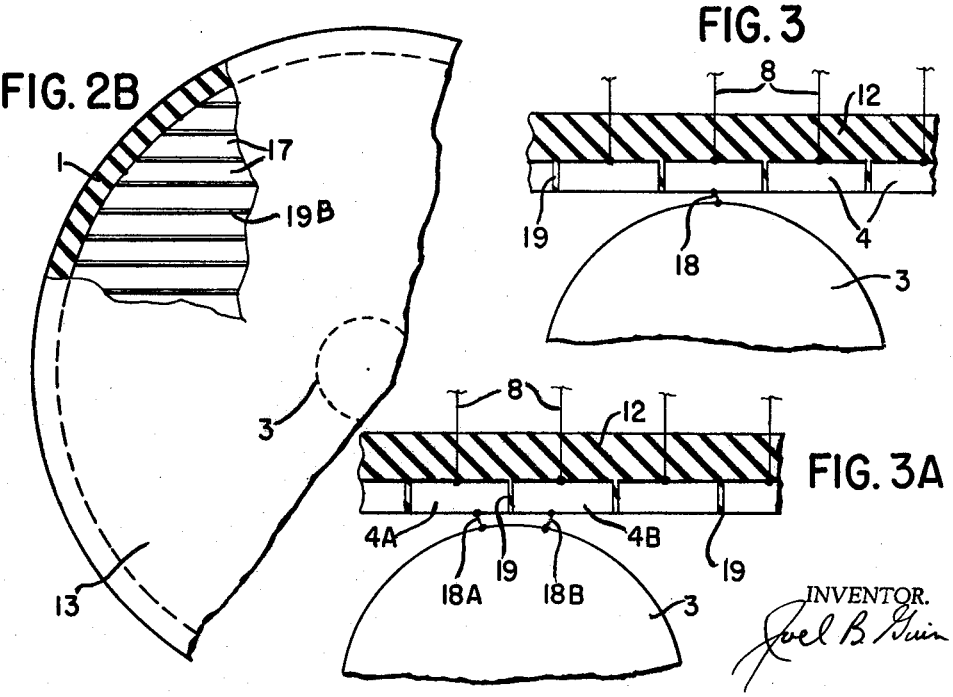
FIG. 2B
FIG. 3
FIG. 3A
INVENTOR.
Joel B. Guin March 3, 1970  J. B. GUIN  3,498,137
MOTION MEASURING INSTRUMENT
Filed July 22, 1965  3 Sheets-Sheet 2
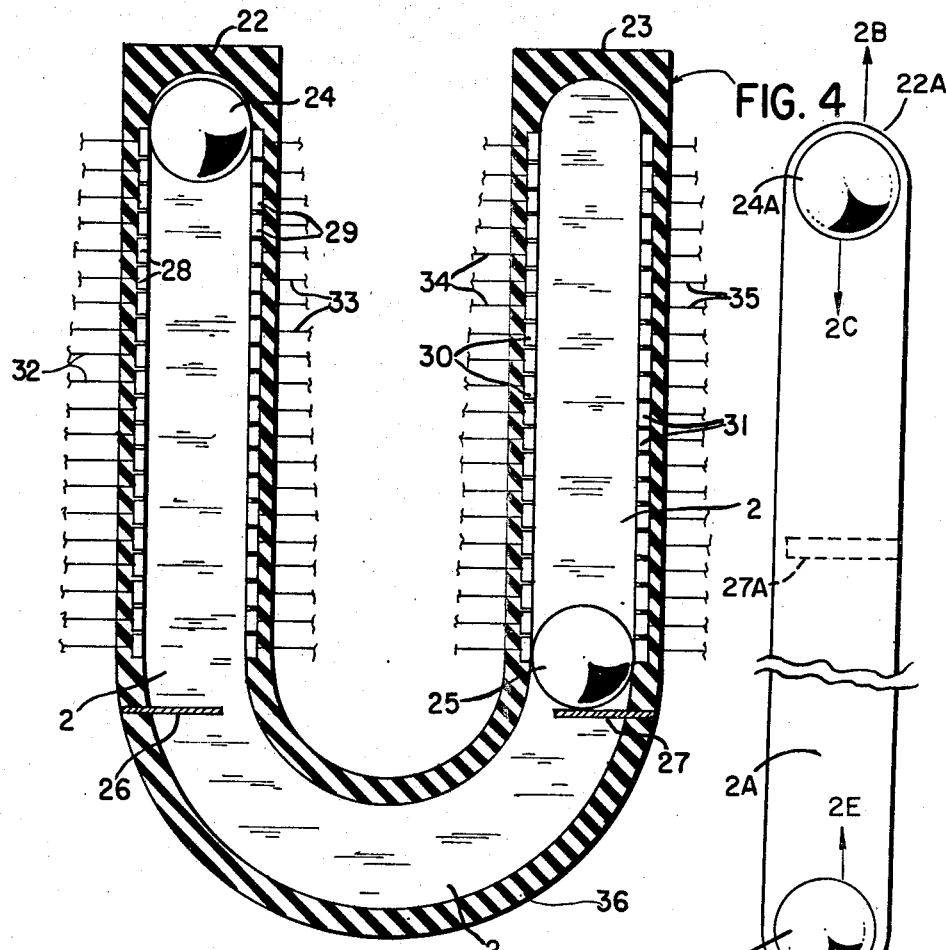
FIG. 9
FIG. 4
FIG. 4A
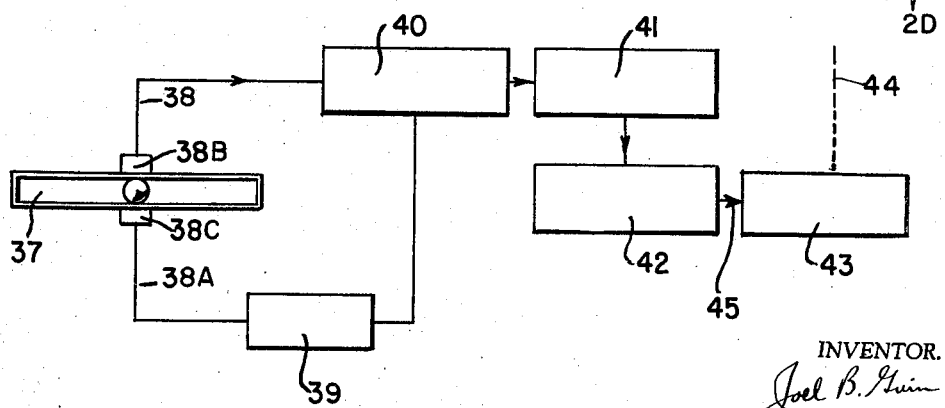
INVENTOR.
Joel B. Guin March 3, 1970 J. B. GUIN 3,498,137
MOTION MEASURING INSTRUMENT
Filed July 22, 1965 3 Sheets-Sheet 3
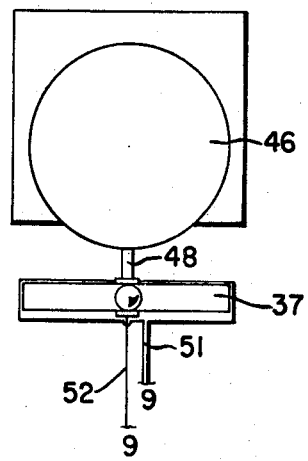
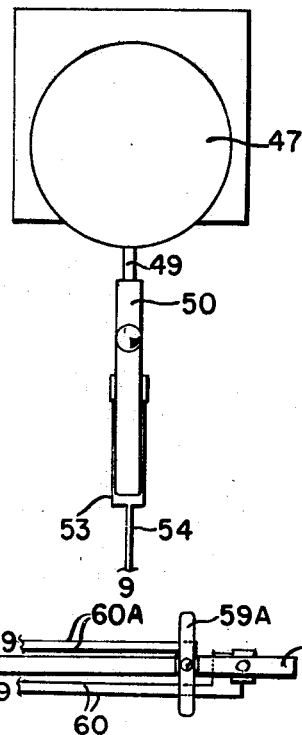
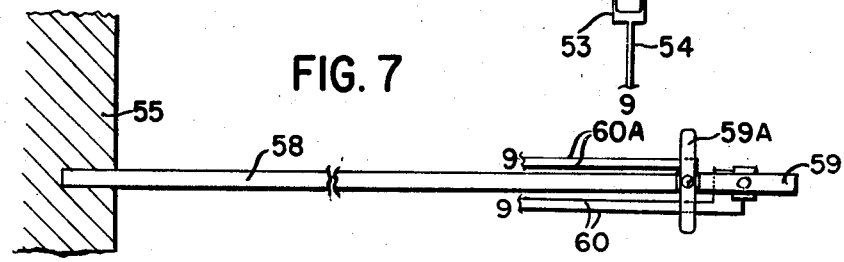
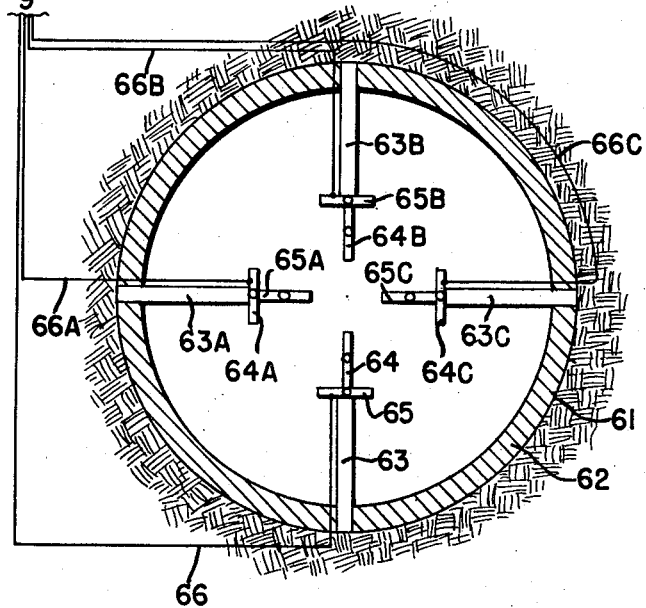
INVENTOR.
Joel B. Guin

United States Patent Office 3,498,137
Patented Mar. 3, 1970

3,498,137
MOTION MEASURING INSTRUMENT
Joel B. Guin, 148 E. 48th St., New York, N.Y. 10017
Filed July 22, 1965, Ser. No. 474,123
Int. Cl. G01p *15/08*
U.S. Cl. 73—517
3 Claims

ABSTRACT OF THE DISCLOSURE

This device measures movement or acceleration by registering instantaneously the position of a sphere within a viscous fluid contained in a horizontal housing whose top and bottom are parallel round plates spaced apart sufficiently to permit unhampered movement of the sphere between them, the inner surface of each plate containing a grid made of two perpendicular sets of parallel conducting strips at minute intervals, each strip being individually connected to computer equipment that registers the sphere's position by coordinates as current flows through each of the two perpendicular strips closest to the sphere on one side, then across to and through the sphere, then across to the two perpendicular strips on the other side, then to the computer.

---

This invention relates to a motion measuring device which, when used in conjunction selectively with computers, gyroscopes and or centrifugation means, can perform some or all of the functions of accelerometer, velocimeter, inertial guidance systems, seismograph, seismometer for mineral prospecting, industrial process control, monitor-controller for reconnaissance-photographic-bombing missions of aerospace craft, or a safety-alarm device, with small adjustments it can be a viscosimeter.

The basic device comprises:

A freely moving, light, conducting ball, which may be hollow, within a conducting viscous fluid;

Surrounding and containing this viscous fluid, two parallel plates, whose peripheries are connected, each consisting of a large number of narrow conducting strips, the strips in the upper plate perpendicular to the strips in the lower plate, each strip in both plates individually connected by wire to a computer; non-conducting or insulating material in minute slits separating each strip from the strips on either side, in both plates; the space between contained ball or and the plates above and below being so narrow that a small electric current can flow from any of said strips through the conducting fluid to the ball, around the ball, through the conducting fluid into the closest strip in the opposite plate;

The combined effect of the device being to permit instant and accurate positioning of the ball in two dimensions between the two plates which are kept horizontal at all times.

To supplement the horizontal plates by furnishing a measuring device for the third dimension, vertical, a vertical straight tube is provided containing one conducting ball within viscous fluid, or a vertical U-shaped tube containing two conducting balls within viscous fluid, each tube being divided into narrow strips, each wired to a computer, and attached to the horizontal plates if desired.

Similar tubes may be placed in a variety of patterns, such as: to replace the basic device plus the one vertical tube, three tubes mutually perpendicular to and at right angles with each other, one tube measuring acceleration in each dimension, thus measuring all movements in any direction accurately, when properly calibrated and connected to computer equipment; an economical modification—two (or more) tubes mutually perpendicular, each slanting at 45 deg.'s. From the horizontal, one or more tubes set at any desired angle from vertical to horizontal, placed at any desired angle.

This inventor has found that at some speeds and in some fluids, a sphere at one end of a tube and heavier than the contained fluid, and another sphere at the opposite end and lighter than the contained fluid, will both leave their ends, at speeds dependent on the acceleration given the tube and on the density and viscosity of the fluid, and continue till they meet, each sphere returning to its original position when the acceleration stops.

The intended purpose will obviously determine the size of components, number and width of strips in the basic device, tolerances allowed, pattern of construction, auxiliary equipment used, etc. Since the parallel plates containing a sphere within viscous fluid is basic to all uses, a few different sizes with two or three different thicknesses of strips and of separating insulation sufficing for all uses, should fill the requirement for replacing thousands of varied instruments now in use. In many cases it can perform functions that no present instrument can perform, such as in inertial guidance systems and in viscosimeters and accelerometers, or can perform them better.

Present accelerometers are rather crude. The usual linear accelerometer is a mass free to move in one direction against a restraining spring. If the period of free oscillation is less than that of acceleration, the deflection of the spring is proportional to the acceleration. This free period decreases as the mass is reduced or the spring is stiffened, both of which lower the sensitivity of the accelerometer, this sensitivity being defined as the deflection of the spring per unit of acceleration. To measure shorter interval accelerations requires greater sensitivity still, and this introduces a serious difficulty, the essential damping.

Since overshoot and extraneous vibrations mask the real acceleration in undamped accelerometers, it is common to use air or liquid viscous damping, or electromagnetic damping devices. Here less than (about 0.7) critical damping allows best performance. In the present invention a viscous fluid is an integral part of the device and its action figures in the calibration of the device; thus damping is achieved with no loss of sensitivity, no delay and no "dead time." The device thus eliminates several deficiencies of present accelerometers: the tendency for tiny accelerations to be damped out completely; the reduction of the effect of all accelerations; and, in a series of closely spaced accelerations, a built-in cumulative error due to a residual negative factor after each acceleration is damped, each increment of error being greater as the accelerations are closer together, and the total error growing till the spring and mass come to a full stop, when the error is brought to zero. In the case of an accelerometer with full critical damping two heavy accelerations in rapid succession could be damped down to register as only one; 3 or 4 could be damped down till they registered as only two, etc. None of this could happen with this invention no matter how rapid or heavy the accelerations.

These deficiencies are pointed up by the costly, inefficient means used to obtain rapid response to closely spaced accelerations: the deflection of the sensitive unit for each single acceleration is reduced and the deflections are measured by electric transducers, such as differential transformers, resistance-wire strain gages, or a variable reluctance. As expected, liquid or electromagnetic damping is essential. The output of the electric transducers is amplified and fed to an electric recorder. (For the highest response speed, the sensitive unit is a weight-magnetostriction unit—with nickel core, or a weight-piezoelectric crystal, both expensive, the mutual frequency of which is about 10,000 c.p.s. The output of either—magnetostrictive or piezoelectric—is fed to an oscillograph.)

Angular velocity presents problems, Angular acceleration (the rate of change of angular velocity of a rotating body), presents worse problems, but many are subject to measurement by the basic device of this invention, but the subject is too complex for detailed discussion in this space. One obvious application would be a generator or motor: if the shaft is vertical, a pair of small-diameter parallel plates containing viscous fluid and sphere, could be attached horizontally to the end; if shaft is horizontal, to prevent use of vertical plates on the end, two 45 deg. bevel gears could produce a rotation of horizontally placed plates. The speed of rotation could also be geared down. Single centrifugal forces are quite limited near the center, this device could give data on angular velocities and accelerometers adequate for many requirements.

In accelerometers used in some aircraft, due to damping loss a mechanical amplification of the deflection on the mass is used to indicate roughly, by means of a maximum-indicating pointer, low-frequency accelerations, whereas in the present invention every movement regardless of rapidity is fed into the ADP or EDP equipment which instantly analyzes and/or interprets and records it, and signals necessary action, if any. These automatic signals make this device particularly useful as the core of inertial guidance systems for aerospace craft, MOL's, Titan, Polaris, Tiros, Samos, Saturn, etc. In all these uses, the invention will be suspended from or mounted on gyroscopes. Due to its innate versatility in cooperation with suitable ADP or EDP equipment, it can perform numerous types of missions next to impossible with present equipment. For example, the flight of an unmanned reconnaissance plane, missile or rocket could be pre-programmed into the computer, causing it to change altitude and/or direction at any one or more times and places on its journey, to avoid enemy planes or rockets, to decoy enemy missiles or planes, to test out his anti-missile defenses, to feign an attach on one area in order to deplete the enemy supply prior to the main attack on another area, etc. Pre-programmed instructions could also cause it to respond automatically to various accelerations such as enemy anti-aircraft shell explosions, bomb explosions on the ground or updrafts from heat produced by enormous fires or H-bombs, by taking evasive or deceptive action, follow-up attack actions, etc. The sight of enemy missiles doing slanting figure-8's, ovals, triangles, etc. overhead would hardly encourage the population or leaders of any nation subject to such maneuvers. In cooperation with photographic, radar, target-sighting and bomb-releasing equipment on the same plane or missile, all already known, whose control and direction would be pre-programmed into and performed by the same computer, a combined reconnaissance-photographic-bombing mission could be carried out by a single aerospace craft, unmanned or manned.

Potential industrial control applications are innumerable. For controlling slow-rotation machines the basic device could be directly attached horizontally to either end of a vertical shaft, or as described above, to the vertical end of a horizontal shaft by intermeshing gears (which could also gear down the r.p.m.'s). Due to wire connection difficulties, the computer might also have to be attached in the same place. Rapidly rotating machines could be geared down to receive attachments of the basic device, computer, and gyroscope if needed. For monitoring tape—or punchcard-controlled milling operations, the basic device can be attached directly to the machine, the correct machine-movements being programmed into the nearby computeer which compares the action signals it sends to the machine, to the monitor signals that the basic device sends back: such monitoring or "double-check" would prevent spoilage of very expensive materials, and reduce the number of rejects.

For monitoring, safety and alarm signalling, etc. In pipes carrying oil, chemicals, waer, sewage, etc. a basic device mounted on a gyroscope could be movable anchored within the stream inside the pipe, or fastened to a flexible beam or cable projecting through the pipe walls, at any crucial point such as behind valves or pumps, before and/or after junction points, places where other fluids are to be periodically pumped in, at all danger points, etc. In this application the basic device could be replaced by one of the above-described variations using two or more tubes, U-shaped tubes or pairs of tubes containing spheres with specific gravity above and below that of the viscous fluid contained, the tubes being mutually perpendicular, one or a pair for each dimension to be measured, these serving as a double-check to supplement the computer that controls the entire operation already. This equipment could be used in cooperation with present sensing equipment to monitor or control refinery and chemical plant mixing and flow operations.

A completely different application would be a simple seismograph, made by attaching to one end of a vibratable beam within an underground cavity the basic device and tube with contained fluid and spheres, these being connected to a computer for analysis, interpretation, recording and read-out. A more sophisticated and accurate seismograph would contain within an underground sphere a plurality of smaller beams to each end of which would be attached the basic device plus choice of single tube, U-shaped tube or pair of tubes, containing fluid and spheres, all plate strips and tube sections being connected to a computer.

One of the potentially most valuable uses for this invention is an improved seismometer for oil and mineral prospecting. Present seismic exploration involves, planned explosions at a number of "shot points" over the area being tested, the blast waves therefrom being transmitted to six or more geophones (seismometers or transducers) arranged in a set pattern. An often used pattern has geophones spaced at equal distances on a straight line passing through the shot point: this associates wave trains with their wave types and patterns more easily. The wave trains identifiable in the records consist mostly of refracted longitudinal waves and of interface waves which have both longitudinal and transverse components, the latter being mostly surface waves or "ground roll."

The chief deficiency of this system is human: the skill, experience and luck of the operator: the indefiniteness and dearth of good information force him to interpolate, extrapolate and infer from the time of the wave travel and from general principles of geometry of the path traversed by each wave train, and thus the position and slope with reference to the operational surface of the subsurface which reflected or refracted the waves. In plotting distance vs. time, the first wave to arrive at the seismometer is considered to have traveled directly from the shot point along the surface of the ground at a velocity $V_1$. Later, delaying waves are considered to have gone down into the earth varying distances, to have encountered varying amounts of rocks, etc. to have an incidence angle $\theta$ (theta) to the reflecting or refracting subsurface, and one of these waves is nominated "it" and assumed to have grossed the subsurface at a velocity $V_2$, then to have proceeded upward at an emergence angle assumed to be the same $\theta$ (theta). One line is drawn through the various points, each being the supposed distance, and the time, to one seismometer of the above hegira: another line is drawn through the points representing the time and distance of the surface wave to the seismometers. Where these two lines join is considered very crucial: the distance from this point to the shot point depends obviously on the two velocities, $V_1$ and $V_2$, and the depth of the reflecting or refracting subsurface, yet from this "critical distance" both velocities and the depth of the subsurface layer are computed.

The refraction shooting method provides information about the velocity of the refracting medium as well as its depth, whereas the reflecting method gives depth information only. The refractive method is somewhat effective for high-speed layers at great depth, but the shot hole to seismometer distances runs into miles, requiring that enormous amounts of explosives be hauled around. As a result, the reflection method is more in use today, and is essentially an echo-sounding procedure. Energy is reflected at each discontinuity where the velocity changes because of changes in density, elasticity or both. These changes occur at geological formation boundaries. Seismometers are usually set up 900–2200 feet from the shot point. If the reflection level there is shallow the farthest seismometer will be close: with depth this distance increases. Since the operator is usually interested in one reflection level, he should know at about what time reflections from this level will appear on his seismometers, so that he can arrange to array them so as to keep out unwanted waves at critical moments. The time for the blast wave to reach the reflection level and echo back is measured, and will increase with the distance between the shot point and the seismometer. The reflection pulses will therefore angle across the record, the angle depending on the depth to and the slope of the reflecting subsurface.

Each record will give data as to the depth and slope of one or more reflecting horizons. If the operator can confidently correlate between records he can draw a time-distance contour map, similar to a topographic map, of the reflection horizon. Such correlation is almost impossible in some areas: then the operator maps a phantom horizon consistent with all the dips by using the slops of reflections recorded during a limited time period. The velocity must be known if he is to connect the observed times and distances; since his reflection observations do not yield this data directly, he must usually estimate the velocity. This "guesstimating" depends on his training, experience and luck. Any error will accentuate or minimize the subsurface topography and over- or under-estimate the depth. Or he can order shorts at a well site: together with the well-log this can provide needed velocity data. The raw data thus produced are time intervals with differences measured in milli-seconds, all related to the seismometer "spread" and to the surface and sub-surface geology. In final analysis, success or failure depends on the operator's ability to visualize the wave paths that caused these time differences.

The chief advantages of a seismometer based on the present invention are: instead of one point for the surface wave train and one for the assumed wave from the reflecting horizon, a whole line of points can be obtained at each seismometer for each shot; and an accurate reading as to the directions of each point in this line of points permits far more complete and accurate visualization of the reflecting horizon to be drawn. This will reduce the number of instruments required for an accurate subsurface chart or plot, and the final result will depend less on the individual skill and luck of the operator.

Another completely different application is a viscosimeter. The basic device is already like one in many ways, and can be made into one by simply mounting the basic device on the end of a beam or the side of a drum rotating in the horizontal plane, or on or within other centrifugation means. A simpler application would be one of the tube modifications described above, such as a single tube calibrated and connected to a computer. The ball may be heavier than the fluid, in which case centrifugal force causes ball to displace fluid, or the ball may be lighter than the fluid, in which case centrifugal force causes fluid to replace ball: therefore a double-acting viscosimeter is made by using the pair-of-tubes variation, one tube having a sphere heavier than the fluid, and placed at the inner end at the start, the other tube having a sphere lighter than the contained fluid and placed at the outer end at the start of centrifugation. In the first case, the heavy ball moves outward, and in the second case the lighter ball is displaced by the fluid and moves inward, the speed of movement determined by the centrifugal force, the density and viscosity of the fluid and the diameter of the spheres with reference to the diameter of the containing tubes, all of which are parts of the calibration data, and of the programming of the computer.

The over-all object of this invention is to provide a general purpose instrument that can be constructed in a variety of modifications each of which can be used selectively with a computer and/or gyroscope and/or centrifugation means and/or other auxiliary equipment to perform most or all of the functions of a velocimeter, an accelerometer, an inertial guidance system and/or monitor-controller for aerospace craft, an industrial monitor-coordinator-safety-alarm-flow control system, a seismograph, a seismometer for geophysical prospecting, or a viscosimeter, etc.; to perform some functions better than these devices; and to perform many functions beyond the capacity of any of them. The chief advantages can be summarized as: simplicity; standard construction; economy; versatility; no necessity for being initialized or "zeroed" after each recording; accumulation of all movements, large or small, slow or rapid, instantly and algebraically; viscous fluid whose automatic damping effect is figured into the calibration, thus eliminating all need for damping since the fluid is an integral part of the instrument.

These applications, objects and advantages will be clearly understood, and other advantages will appear upon careful, examination of the inclosed description in conjunction with the drawings in which FIG. 1 is a vertical section through the basic device, which is substantially two parallel plates inclosing fluid and a sphere;

FIG. 2 is a top view of the basic device of FIG. 1;

FIGS. 2A and 2B are top and bottom views respectively of the vertical and horizontal contact strips respectively, of the plates;

FIGURES 3 and 3A show circuit closures by sparks.

FIG. 4 is a vertical section through a U-shaped tube for measuring vertical accelerations;

FIG. 4A is a vertical tube modification which also measures vertical accelerations;

FIGS. 6 and 6A show gyroscope mountings for horizontal and vertical motion measuring devices respectively;

FIG. 7 shows a simple type of seismograph, a vertical and a horizontal measuring device, both attached to the end of a beam;

FIG. 8 is a more complex and more accurate seismograph, consisting of a number of devices on beams projecting from the walls of an underground sphere, all devices being connected to computers;

FIG. 9 is a block diagram of the main circuit parts, including the computer components.

Turning now to the drawings:

FIG. 1 is a vertical section through a basic motion measuring device consisting mainly of a flat section of a cylinder 1 made of nonconducting material, and filled with a viscous fluid 2. A sphere 3 made of conducting material such as steel, within the cylinder 1, is freely movable since there is no metal-to-metal friction. The top and bottom of cylinder section 1 consists of nonconducting plates 12 and 13 respectively, into which are imbedded multiple conducting plates 4 in the top and 10 in the bottom respectively, separated by nonconducting layers 19. Connected to all plates 4 and 10 are individual circuit wires 8 and 11 respectively which lead to measuring, interpreting and analyzing apparatus 9 (FIG. 9).

FIG. 2 is a top view of the horizontal plate of the basic device showing the squared areas resulting from having both vertical and horizontal conducting strips in the same plate, producing squares 4 imbedded in upper plate 12, separated by nonconducting layers 19. For some uses this pattern is best.

FIGS. 2A and 2B represent a more economical modification, showing top and bottom plates respectively, into which are imbedded vertical conducting strips 16 and horizontal strips 17 respectively, all of which are separated by insulating slits 19A and 19B respectively. Dotted lines 3 show position of sphere 3 of FIG. 1, the position being signalled electrically by contacts to strips 16 and 17, each of which is connected by wire to ADP or EDP apparatus.

FIGS. 3 and 3A show two possible circuit closures. A circuit is closed when current can flow from the bottom contact strips through fluid 2 (FIG. 1), to sphere 3, around or across the sphere, through the fluid 2 on the upper side and to one of the contact strips in upper plate 12 (FIGS. 1 and 2A) by means of a spark discharge, or in the reverse direction from top plate 12 to bottom plate 13. In FIG. 3 one spark 18 between sphere 3 and an upper contact strip 4 closes the circuit. In FIG. 3A sphere 3 is midway between two upper contact strips 4A and 4B, separated by insulating slit 19. In such cases, which are not too common, the circuit may be closed by two spark discharges 18A and 18B. For close measurements, a "discriminator" unit will have to be added to the EDP analyzing and interpreting apparatus.

FIG. 4 shows a device for measuring vertical accelerations, consisting mainly of left and right hollow non-conducting tubes 22 and 23 respectively, each containing viscous fluid 2, and connected at the bottom by arc 36. Tube 22 integrates downward movements by means of conducting sphere 24 which is slightly lighter than fluid 2, left and right contact strips 28 and 29 respectively to which are attached circuit wires 32 and 33 respectively. Any downward acceleration of tube 22 (and 23) will cause fluid 2 to displace lighter sphere 24, forcing it downward: in going down it will successively pass through lower and lower contact strips 28 and 29, each pair signalling to the computer apparatus the new location. Right tube 23 integrates downward movements by means of sphere 25 which is heavier than fluid 2, and left and right contact strips 30 and 31 respectively, to which are connected circuit lines 34 and 35 respectively: inertia keeps sphere 25 in place "in space," i.e. tube 23 moves down around it. The rate of movement of spheres 24 and 25 down or up depends on the density and viscosity of fluid 2, the specific gravity of the spheres with reference to fluid 2, and the diameters of tubes 22 and 23 with reference to the diameters of spheres 24 and 25 respectively. The measuring range in tubes 22 and 23 is limited by means of stopping plates 26 and 27.

FIG. 4A is a schematic view of a modification of the device described in FIG. 4, consisting of tube 22A inclosing fluid 2A in which is contained top sphere 24A slightly lighter than fluid 2A and bottom sphere 25A slightly heavier than fluid 2A. A downward acceleration (arrow 2B) of tube 22A will cause heavier liquid 2A to displace sphere 24A for specific gravities within a narrow range (which must be found by experiment). Inertia will keep sphere 25A in place. A downward acceleration (arrow 2D) of tube 22A will produce a movement of both spheres: sphere 24A, lighter than fluid 2A will be displaced thereby and forced downward (arrow 2C); and sphere 25A, heavier than fluid 2A, will because of inertia be forced upward (arrow 2E) relative to adjacent connecting strips 30 and 31, which signal the changing position to the computer. If acceleration continues the spheres will meet unless prevented by stopping plate 27A: if the tube were large enough the spheres could continue to opposite ends of tube 22A.

FIG. 6 shows a horizontal basic device 37 mounted below and attached to a schematically drawn gyroscope 46 by means of attachment 48. To remain absolutely horizontal the upper circuit lines 51 and lower circuit lines 52 leading to analyzing apparatus 9 (FIG. 9) must be perfectly balanced.

FIG. 6A shows the mounting for a vertical basic device 50 below gyro 47, mounted by attachment 49. Again left and right circuit lines 53 and 54 must be perfectly balanced.

FIG. 7 shows a horizontal basic device 59 and a vertical single tube or U-shaped tube 59A having circuit lines 60 and 60A respectively mounted on a long vibratable beam 58 whose opposite end is securely fastened in the wall 55 of an underground cavity, for the purpose of measuring earthquakes and earth tremors, as well as distant nuclear explosions and nearby lesser disturbances. Basic device 59 integrates horizontal vibrations and vertical device 59A integrates vertical vibrations through their respective circuit connections to the measuring, analyzing, interpreting and recording ADP or EDP equipment which is an essential part of this application, the computer "print-out" being a more complete, though different, and fully as useful, record than a seismograph.

FIG. 8 shows a more sophisticated application of the basic device and the vertical tube modifications. Four cantilever beams 63, 63A, 63B and 63C are fastened to the walls of underground sphere 62, and have attached to their inner ends vertical tube measuring devices 64, 64A, 64B and 64C respectively and horizontal basic devices 65, 65A, 65B and 65C respectively: attached to all the contact strips of both vertical and horizontal devices are wires which are collected into cables represented by lines 66, 66A, 66B and 66C, which convey all signals to computer 9. Various modifications of this sphere, which is spherically symmetrical and may contain every requisite number of measuring devices placed where needed around the inner wall, can serve as a seismometer for geophysical prospecting, as a seismograph, or as a warning device for nuclear bomb tests, a number being installed in geographical locations wherever likely to be useful.

FIG. 9 is a general block diagram of the measuring, analyzing, interpreting and applying computer units such as those suggested throughout this description, particularly for FIGURES 1, 2, 2A, 3, 3A, 4, 7, 8, 10, 10A, 11, 11A, 12 and 12A. Particular application here is to the basic device of FIG. 1, here numbered 37. Circuit lines from the upper contact strips are gathered into collector or cable 38, circuit lines from the lower contact strips are gathered into collector or cable 38A, after passing through switching boxes 38B and 38C respectively. A signal is produced by closing the circuit between battery and condenser unit 39 and discriminator 40 which differentiates between closure by one or by two spark discharges between the sphere and contact strips. (See FIGS. 3 and 3A respectively.) The signal is carried to multi-position analyzer 41 which determines the position of the sphere concerned, thence to computer 42 which computes:

The impulse to be given as a result of the sphere displacement, as in the case, for example, of a steering device in a rocket;

The direction from which a seismic wave comes, as in the case of a geophone for geophysical prospecting;

The origin of a quake or tremor, as in the case of an earthquake or nuclear bomb explosion.

The resulting data then flow as shown by arrow 45 to the impulse applying unit 43, which may obtain secondary impulses from other auxiliary measuring devices suggested before. This same type procedure would be used for measuring, analyzing, interpreting and applying information from vertical tubes, or those in other positions suggested in the descriptions.

I claim:

1. In a device for measuring motion by registering changes of position of a sphere within a viscous fluid, the improvement that comprises:

a horizontally mounted housing containing said fluid and defined by parallel upper and lower plates each peripherally attached to the top and bottom respectively of a flat section of a cylinder, the fluid being of selective viscosity and the contained sphere of conducting material;

mounted along the inner surface of each of said plates, a plurality of horizontal parallel strips of conducting material separated by insulating material and presenting a smooth surface to the contained sphere, the strips on the upper plate running in a direction perpendicular to that of the strips on the lower plate, the distances between said smooth surfaces being substantially equal to the diameter of said sphere so that movement therebetween of the sphere is hampered only by the damping of said viscous fluid, each of said strips being individually connected by wire to a computer means which measures motion by instantly recording the coordinates of the sphere as it closes one circuit after another in crossing said conducting strips, the current flowing from the computer by way of the conducting sphere and the nearest conducting strip above and below, each giving one of two coordinates since they are perpendicular to each other, said computer means being adaptable to being programmed selectively to record and integrate movement during designated time intervals and to initiate appropriate responsive action.

2. A device as set forth in claim 1 wherein the parallel strips on each plate are all divided into a plurality of subtantially square sections, each electrically insulated from the other by insulating material, and each section is electrically connected to the computer means.

3. A motion measuring device as described in claim 2 in combination with gyroscopic stabilizing means to keep it properly oriented when in use.

References Cited

UNITED STATES PATENTS

| 2,653,389 | 9/1953 | Butterworth et al. | |
| 1,626,567 | 4/1927 | Steinbrecht. | |
| 2,098,476 | 11/1937 | Webster. | |
| 2,165,894 | 7/1939 | Hohndorf | 73—515 XR |
| 2,338,811 | 1/1944 | Hasbrook. | |
| 2,490,785 | 12/1949 | De Vany. | |
| 2,733,116 | 1/1956 | Fantham et al. | 73—517 XR |
| 2,974,531 | 3/1961 | Ackerman | 73—516 |
| 3,029,644 | 4/1962 | Loveless et al. | 73—516 XR |
| 3,141,339 | 7/1964 | Koril | 73—504 |

FOREIGN PATENTS

| 583,425 | 9/1933 | Germany. |
| 814,800 | 6/1959 | Great Britain. |

JAMES J. GILL, Primary Examiner